Figure 5:
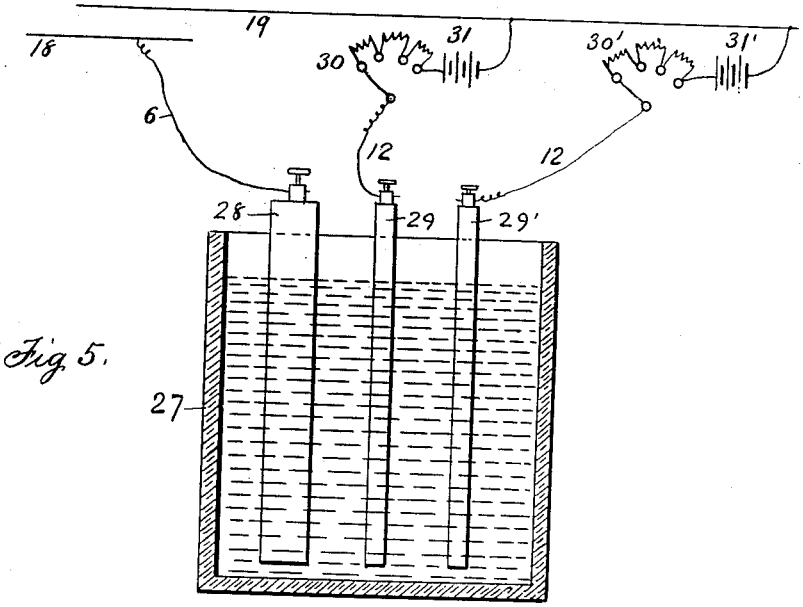

No. 861,282. PATENTED JULY 30, 1907.
A. S. HICKLEY.
ELECTROLYTIC ALTERNATING CURRENT RECTIFIER.
APPLICATION FILED APR. 16, 1907.
2 SHEETS—SHEET 1.
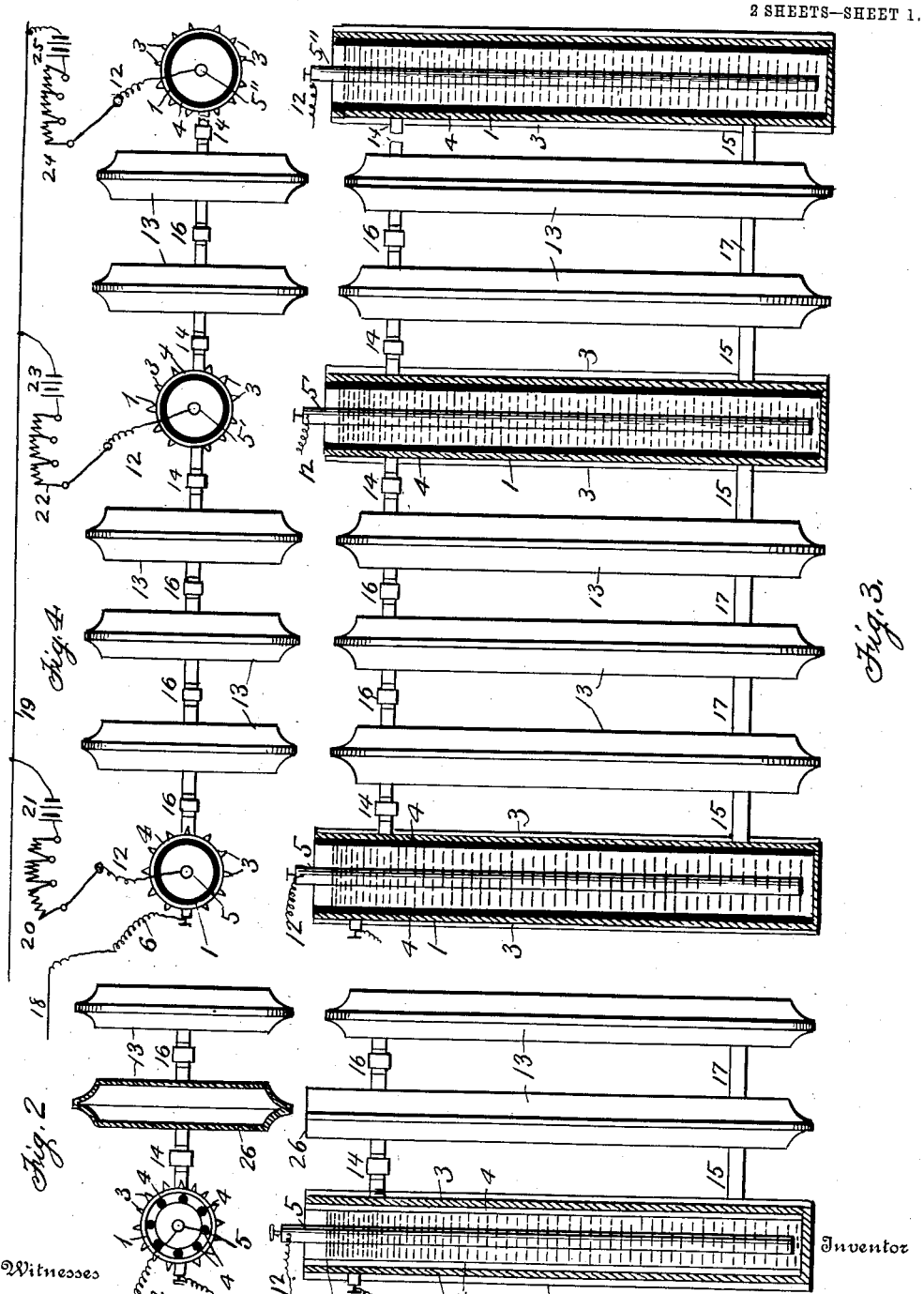

UNITED STATES PATENT OFFICE.

ARTHUR S. HICKLEY, OF MANASQUAN, NEW JERSEY.

ELECTROLYTIC ALTERNATING-CURRENT RECTIFIER.

No. 861,282.　　　　　　　Specification of Letters Patent.　　　　　　Patented July 30, 1907.

Application filed April 16, 1907. Serial No. 368,464.

*To all whom it may concern:*

Be it known that I, ARTHUR S. HICKLEY, a subject of the King of Great Britain, residing at Manasquan, in the county of Monmouth and State of New Jersey, have invented certain new and useful Improvements in Electrolytic Alternating-Current Rectifiers; and I do hereby declare the following to be a full, clear, and exact description of the invention, such as will enable others skilled in the art to which it appertains to make and use the same.

My invention relates primarily to electrolytic cells, has especial reference to such cells which are used for transforming alternating currents into direct currents, electrolytic interrupters and the like, has for its object maintaining a low degree of temperature of the electrolyte and the electrodes, and augmenting and increasing the efficiency of the electrolytic cell by conducting separate circuits of varying amperage from separate electrodes in the cell or plurality of cells, whose combined amperage is in excess of the amperage commercially obtainable from a single active electrode.

The invention consists in certain improvements in construction which will be fully disclosed in the following specification and claims.

It has been demonstrated in practice that a cell composed of two or more electrodes, one of which is not acted upon by certain chemicals, such as phosphate of soda, carbonate of soda or other chemical solution, and the other electrode which in the same solution has a film or hydroxid formed upon it when the current is attempting to pass from it to the non-active electrode, (such an electrode so acted upon being preferably aluminium or some of its alloys) that after a short time the electrolyte becomes hot and only a limited amount of current can be passed from a given area of aluminium, and also that increasing the area does not overcome the difficulty, but rather causes greater loss in the conversion of the alternating to direct current.

I have discovered that if the non-oxidizable electrode is large enough and of the proper form, I can introduce more than one film forming electrode and connect them to separate storage batteries, coils or other apparatus and obtain as much current from each and all of these separate electrodes, and I may use one circuit for the armature and another for the fields of a motor, and to charge storage batteries, produce light in lamps, and electroplate, all from the same rectifier, but from different electrodes in the same electrolytic cell, at the same time by introducing resistances in the circuits to suit the different purposes.

The invention is not restricted in its use to rectifiers, as it is equally adapted to liquid resistances and the like.

In the accompanying drawings, which form part of this specification:—Figure 1 represents a vertical section partly in side elevation, of an electrolytic cell and a hollow member attached thereto. Fig. 2 a top plan view of the same. Fig. 3 a side elevation partly in section, showing several cells connected by hollow members and forming a compound electrolytic cell. Fig. 4 a plan view of the same. Fig. 5 a vertical section of a modified form of cell shown connected to a main wire, and Fig. 6 a like view of another modified form of cell.

Reference being had to the drawings and the designating characters thereon, the numeral 1 indicates a receptacle for containing a suitable electrolyte 2, and forms a hollow electrode, on the outer surface of which are fins 3 exposed to the atmosphere for conducting excessive or surplus heat from the electrolyte and the electrode and diffusing it in the atmosphere.

4 indicates supplemental electrodes, which may be in the form of rods in electrical contact with the interior of the receptacle or electrode 1, as shown in Figs. 1 and 2, or in the form of a sleeve or tube in electrical contact with the receptacle 1, as shown in Figs. 3 and 4, and 5 indicates a separate electrode, preferably of aluminium. The receptacle or electrode 1 is provided with a wire 6 for connecting with one of the alternating current main lines, and the electrode 5 is provided with a wire 12 which forms the positive pole for supplying direct current.

In the preferred form of construction, the receptacle or electrode 1 is made of iron, and the supplemental electrodes 4 of carbon, and the separate electrode 5, preferably of aluminium; it is obvious however that the electrode 1 may be made of aluminium, when the supplemental electrodes 4 are also aluminium, and the separate electrode 5, carbon, iron or other suitable material.

The electrolyte 2 is a chemical solution composed preferably of phosphate of ammonium, or other well known solutions for the purpose.

13 indicates hollow members connected to the receptacle or electrode 1 by pipes 14 and 15, and to each other by pipes 16 and 17, to provide for free circulation of the electrolyte through the receptacle and the hollow members, (which in their relation to the receptacle, or electrode 1, become extensions of the electrode) for the purpose of reducing the temperature of the electrolyte in circulation, and the temperature of the electrodes, by the exposed surface of the hollow members, (whose combined area is in excess of the area of the receptacle 1.) This exposure of the electrolyte in circulation through the hollow members 13 maintains the temperature of the electrolyte and the electrodes at such a degree that the efficiency of the cell is maintained at its maximum capacity.

In Figs. 3 and 4, a compound electrolytic cell is shown, by using more than one of the receptacles or electrodes 1 and connecting them together by the hollow members 13, of which there may be any desired or preferred number, thus greatly augmenting the capacity of the cell and correspondingly increasing its efficiency and power. In this form of the device one receptacle or electrode 1 is connected to one of the main lines 18 by wire 6, and the separate electrode 5 is connected through the variable resistance 20 and the storage battery 21 to the other main line 19. The electrode 5' is connected through the like resistance 22 and storage battery 23 to the same main line 19, and the electrode 5'' is connected through resistance 24 and storage battery 25 to line 19.

The direct current passing through the variable resistances 20, 22 and 24, may be conducted to motors, induction coils, plating baths, or other apparatus requiring direct current.

The hollow members 13 may be open at the top, as shown at 26 in Fig. 2 and can be used as supplemental cells by providing them with separate electrodes, as 5, shown in the receptacle 1.

The receptacles 1 connected to provide for circulation of the electrolyte through the receptacles constitute a continuous or compound electrolytic cell, and two or more separate electrodes 5 may be placed in either of the receptacles and connected through variable resistances and storage batteries to the main wire 19 for supplying direct current to separate motors, induction coils and other apparatus.

A single receptacle or electrolytic cell composed of material that is not acted upon by the electrolyte, and provided with a plurality of separate electrodes acted upon when the electrical current is passing, may be connected in like manner to the main line 19 for the same purpose, or a single receptacle forming a hollow electrode and provided with a plurality of separate electrodes may be used.

In Fig. 5 I have illustrated the former type of receptacle 27, made of porcelain, glass or other non-conductor of electricity, and provided with an electrode 28 of iron, carbon or other like material, connected to one of the main lines 18 by wire 6 and separate electrodes 29, 29' preferably of aluminium, are connected through variable resistances 30, 30' and storage batteries 31, 31' to the other main line 19.

Figure 6:
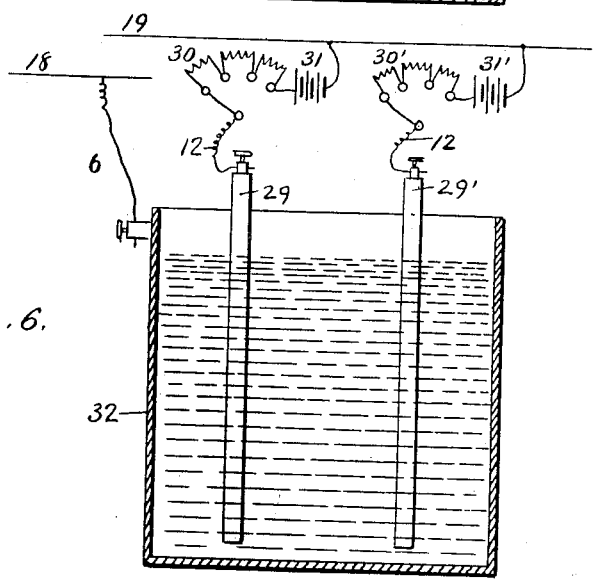

In Fig. 6, the receptacle 32 is made of iron or other conductor of electricity and forms a hollow electrode to which the wire 6 is connected, and the separate electrodes 29, 29' are connected to the main line 19, in like manner as in Fig. 5, and the several parts are indicated by like reference characters.

It is obvious that changes in the form of the receptacles and the hollow members, and in the connections of said members with the receptacles may be made without departing from the spirit of my invention.

Having thus fully described my invention, what I claim is

1. In an electrolytic cell, the combination with a receptacle for containing an electrolyte and forming a hollow electrode, a supplemental electrode within and in electrical contact with said hollow electrode, and a hollow member connected to the hollow electrode.

2. In an electrolytic cell, the combination with a receptacle for containing an electrolyte and forming a hollow electrode, and provided with radiating surfaces projecting from the body thereof, a supplemental electrode within and in electrical contact with said hollow electrode, and a hollow member connected to the hollow electrode.

3. A compound electrolytic cell composed of receptacles forming hollow electrodes connected together to allow the electrolyte to circulate through the electrodes.

4. A compound electrolytic cell composed of receptacles forming hollow electrodes, and hollow members connected to and interposed between the receptacles to allow the electrolyte to circulate through the electrodes.

5. A compound electrolytic cell composed of a plurality of receptacles forming hollow electrodes, and hollow members connected to and interposed between adjacent receptacles to allow the electrolyte to circulate through the electrodes.

6. An electrolytic rectifying cell provided with an inert electrode and a plurality of separate electrically active electrodes, in combination with an electric main line, and separate electrical connections, each connection including an electrical device between each of said separate electrodes and said main line, for utilizing separate currents from the several electrodes in the cell.

7. An electrolytic rectifying cell provided with an inert electrode and a plurality of separate electrically active electrodes, in combination with an electric main line, and separate electrical connections, each connection including a resistance and an electrical device between each of said separate electrodes and said main line, for utilizing separate currents of varying amperage from the several separate electrodes in the cell.

8. A compound electrolytic cell composed of receptacles forming hollow electrodes connected together to allow the electrolyte to circulate through the electrodes, in combination with electric main lines, and separate electrical connections between the electrodes and said lines.

In testimony whereof I affix my signature, in presence of two witnesses.

ARTHUR S. HICKLEY.

Witnesses:
   D. C. REINOHL,
   W. PARKER REINOHL.